Dec. 4, 1956   W. SCHNEIDER ET AL   2,772,696
FLEXIBLE RESIN BONDED MICA MEMBERS
Filed April 21, 1953
Fig. 1.
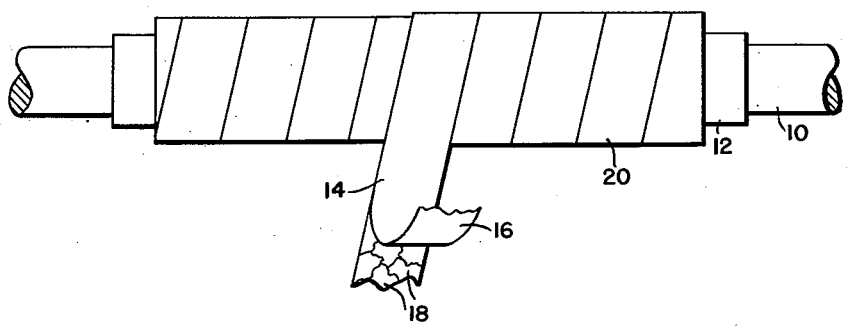
Fig. 2.
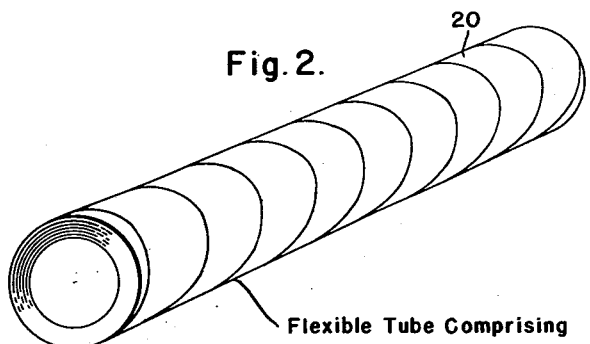
Flexible Tube Comprising Mica Flakes bonded with Partly Cured Polyester Resin
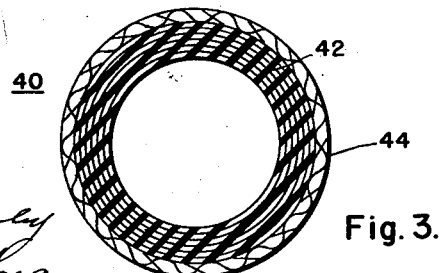
Fig. 3.
WITNESSES:
John E. Hurley
Leon J. Taza.
INVENTORS
William Schneider and
Aubrey W. Worthington
BY
Frederick Shapoe
ATTORNEY

United States Patent Office 2,772,696
Patented Dec. 4, 1956

2,772,696

FLEXIBLE RESIN BONDED MICA MEMBERS

William Schneider, Pittsburgh, Pa., and Aubrey W. Worthington, Irving, Tex., assignors to Westinghouse Electric Corporation, East Pittsburgh, Pa., a corporation of Pennsylvania Application April 21, 1953, Serial No. 350,034

8 Claims. (Cl. 138—55)

This invention relates to flexible members, and, in particular, flexible tubing prepared from mica and a thermosettable resinous impregnant.

In the electrical industry, there has been a long-felt need for insulating members comprising mica and a thermosettable resinous impregnant that possesses flexibility, mechanical strength and good dielectric strength. In certain instances, insulating members such, for example, as tubes have been prepared from mica flakes and a thermoplastic resinous binder such as asphalt, in order to provide for flexibility. However, such combinations have had low strength and were deficient in other mechanical properties. Thus, the bending of the tubing would frequently cause the mica flakes to separate and open up. If thermoset resins were employed as the binder for the mica flakes, the tubing was relatively inflexible and any appreciable bending would cause it to crack or break. In either case, the electrically insulating properties of such members were seriously impaired upon flexing or bending of the mica insulation. Once the mica members were installed in electrical machines, the mica insulation was ordinarily not flexed and would stay indefinitely in the condition in which it was installed.

The object of this invention is to provide members, and, in particular tubing, composed of layers of mica flakes and a partly cured thermosettable resinous binder so that the members could be flexed without damage while maintaining good strength and other physical properties and dielectric insulating properties.

A further object of the invention is to provide a process for producing flexible tubing from mica flakes and a thermosettable resinous impregnant.

Other objects of the invention will, in part, be obvious, and will, in part, appear hereinafter. For a better understanding of the nature and objects of the invention, reference should be had to the following detailed description and drawing in which:

Fig. 1 is a view in elevation showing a step in the preparation of tubing;

Fig. 2 is a view in perspective of a completed tube prepared in accordance with the invention; and Fig. 3 is a cross section through a modified form of tubing.

We have discovered that flexible insulating members and, in particular, flexible tubes, can be prepared from mica flakes and a partly cured thermosettable resinous binder of a specific composition such that the members possess great flexibility, high physical properties and excellent dielectric characteristics. The process for preparing such members will be set forth in detail hereinafter in describing the preparation of tubes, but it will be understood that channels, flat sheets, angles, and other structures may be prepared in a similar manner.

Referring to Fig. 1 of the drawing, there is illustrated a mandrel 10 of circular cross section, but which may be of any other suitable cross section such, for example, as square, hexangular, rectangular and the like. Upon the surface of the mandrel 10 there is preferably applied a layer of parting material 12, which will permit a tube that may be formed thereafter to be readily removed from the mandrel 10. We have found suitable parting layers 12 may comprise a layer of polytetrafluorethylene suspension in water, which is sprayed, brushed or otherwise applied thereto and baked at about 330° C. A sheet or film of polytetrafluorethylene may be wrapped on the mandrel 10 to produce a similar result. A coating of polyvinyl alcohol is another example of a suitable parting material. We have secured good results by applying a film of a thickness of 1 mil of a polymethylene terephthalate polymer—the preparation of such films is described in Patent 2,497,376. A layer of silicone varnish may also be employed as a parting component. Cellophane parting material may be wrapped on the mandrel 10. It will be understood that any two or more of these parting materials may be applied simultaneously if desired.

There is wrapped over the parting material 12 on the mandrel 10 a flexible mica tape 14 in a sufficient number of layers to produce the desired thickness of a tube 20. We have secured particularly satisfactory results by employing a tape 14 composed of a sheet backing 16 on which there is disposed a layer 18 of mica flakes, the mica flakes and sheet backing being united with a liquid resinous binder having a viscosity of between 25 and 10,000 poises at 25° C. It will be understood that the sheet backing 16 may be present on both the front and back face of the layer of mica flakes. Furthermore, the mica tape 14 may be of any suitable width and may even comprise a single sheet the full length of the tube 20.

The pliable sheet backing for the mica tape may, for example, be rope paper, cotton cambric, asbestos cloth, or a sheet or cloth formed of synthetic resins such as polyethylene, nylon, and linear polymethylene terephthalate resin such as is described in Patent 2,497,376. The sheet backing is preferably relatively thin, that is, of the order of from 1 mil to 3 mils in thickness though it may be considerably thinner or heavier than this. Good results have been obtained by employing rope paper of a thickness of 1 mil for both the front and back of the tape with an interposed layer of mica flakes of a thickness of from 3 to 10 mils.

The liquid binders for the mica flakes and the sheet backing may comprise any one or more of a numerous group of stable liquid resinous polymers. In the following Table I are given examples of liquid binders that have been used in preparing suitable mica tape insulation, the polymer being employed in the proportions indicated based on the total weight of the entire insulation.

TABLE I

| Polymer | Approximate Molecular Weight | Percent Bond in Tape |
|---|---|---|
| Polymethylmethacrylate | 1,000 | 10 |
| Poly-α-methyl styrene | 4,000 | 16.4 |
| Polystyrene | 1,500 | 11.2 |
| Coumarone-indene | 1,000 | 6 |
| Polyalphamethylstyrene | 3,000 | 3 to 25 |
| Polymers of styrene and coumarone mixtures | 6,000 | 8 |
| Linear polyester of diethylene glycol and azelaic acid | 1,500 | 10 |

More generally, the liquid binders may be selected from liquid linear polyesters of glycols and mono- or dicarboxylic acids or anhydrides of the latter; arylalkene polymers; polymers of a compound having the formula

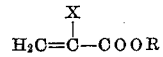

where X represents a monovalent radical selected from the group consisting of hydrogen and saturated aliphatic and cycloaliphatic hydrocarbon radicals and R is selected from the group of monovalent radicals consisting of hydrogen and saturated aliphatic hydrocarbon radicals; coumarone and indene polymers; and polyethylene as well as compatible mixtures of any two or more thereof.

We have also employed a binder composed of from 15% to 75% by weight of polystyrene of a molecular weight between 30,000 and 250,000 and from 85% to 25% by weight of a plasticizer selected from the group of liquid polycyclic hydrocarbons boiling above 270° C. and having a viscosity between 0.5 and 5 poises at 25° C., the group consisting of terphenyls hydrogenated at least 40% or the mono-, di- and polyamyl naphthalenes. The composition is a viscous liquid having a viscosity of between 25 and 10,000 poises at 25° C.

The hydrogenated terphenyl may be produced in any number of ways. Thus, it may be produced by pyrolytic decomposition of benzene, as set forth in Patent No. 2,364,719, or it may be produced by reacting benzene and cyclohexyl bromide in the presence of aluminum chloride, thereby producing isomeric dicyclohexyl benzene, as set forth by von Braun Ber. 60, 1180. A specific product that has been found satisfactory for the purpose, is an isomeric mixture of ortho, meta, and para terphenyls approximately 55% hydrogenated which mixture has a distillation range of from 345° C. to 425° C. and a viscosity of approximately 0.8 poise at 25° C.

Monoisoamyl naphthalene boiling in the range of 280° C. to 330° C., diamyl naphthalene boiling in the range of 330° C. to 365° C. and having a viscosity of 0.9 poise at 25° C., and polyamyl naphthalene boiling in the range of 355° C. to 400° C. and having a viscosity of 5.5 at 25° C., individually or in admixture may be employed in combination with polystyrene with satisfactory results. The following table sets forth the viscosities of a number of compositions produced in accordance with the invention.

TABLE II

Viscosity of various plasticized polystyrenes

| Plasticizer | Plasticizer Content, Percent by Wt. | Viscosity—poises at 25° C. | | |
| --- | --- | --- | --- | --- |
| | | Polystyrene, M. W.= 65,000 | Polystyrene, M. W.= 100,000 | Polystyrene, M. W.= 150,000 |
| Hydrogenated Terphenyl— 55% | 75 | 5,200 | 9,500 | |
| Do | 83.3 | 520 | 850 | 2,750 |
| Polyamyl Naphthalene | 83.3 | | 75 | |
| Do | 75 | | 600 | |
| Do | 50 | | 5,000 | |

The composition composed of polystyrene and polycyclic hydrocarbon plasticizer is dissolved in a volatile solvent such as a benzenoid hydrocarbon solvent, such as benzene, toluene or xylene, or various mixtures thereof, preferably in the proportions of from 70% to 90% of the solvent to 30% to 10% by weight of the composition to produce a thin solution. The resulting solution is applied to the mica flakes and sheet backing by dripping, brushing or the like, and the solvent evaporated by applying heat, or heat and evacuation, to the treated mica tape. A thin sheet of tissue paper or cellophane may be applied over the mica tape so produced to permit it being rolled up since the plasticized polystyrene composition is extremely viscous and tacky. The tapes may be of any desired width. The mica insulation so produced is permanently flexible and does not age, harden or deteriorate appreciably upon being stored for appreciable periods of time.

Exceptionally good insulation has been achieved with composite mica insulation embodying from 3 to 7% by weight of the liquid resinous binder. An example of a tape found to give excellent results in practice was one comprising two sheets of 1 mil thick supercalendered rope paper between which was introduced a layer of from 3 to 5 mils thickness of mica flakes of an average diameter of an inch and from 3 to 7% by weight of polyalphamethylstyrene of an average molecular weight of between 400 and 2,000, the polymer with an average molecular weight of 500 had a viscosity of approximately 2,000 poises at 25° C. The composite tape so produced feels and appears to be dry but is bonded together extremely well and possesses great strength so that it can be taped firmly upon conductors without loss of mica flakes. We have prepared such mica tapes using mica flakes of an average area of 10 square inches and others in which the mica flakes were each a small fraction of a square inch in area.

After the mica tube 20 of suitable wall thickness and length has been prepared by wrapping the tape 14 on mandrel 10, the outer surface may be wrapped with a reinforcing or strengthening material such, for example, as glass fiber tape. It should be understood, however, that the glass fiber tape is not necessary for many applications. Tubes to be used as collector ring lead insulation may have their outer surfaces covered with glass fiber tape to advantage since this increases their resistance to abrasion and other wear and tear.

The mandrel 10 with the tube 20, with or without the surface layer of fibrous tape, is then impregnated, preferably under vacuum, with a liquid completely reactive thermosettable resinous compositition, which is compatible and miscible with the liquid resinous binder present in the mica tape. For the purpose of this invention, we have found that particularly good results are secured with liquid thermosettable resinous compositions which comprise essentially from 30 to 60% by weight of a liquid vinyl aryl monomer, and from 70% to 40% by weight of an unsaturated polyester resin dissolved therein. The preparation of these liquid compositions will be set forth hereinafter in more detail. Preliminary to the vacuum impregnating procedure, it may be desirable, though not necessary, first to heat the mandrel with the tube 20 thereon to a temperature of above 100° C. and up to as much as 175° C. to drive off moisture and volatiles, either while exposed to the atmosphere or under vacuum. After cooling the mandrel and tube 20 thereon to a temperature not in excess of 50° C., impregnation is effected by placing it in a tank, evacuating the tube 20 and flooding or immersing it in the liquid completely reactive thermosettable composition. For heavier wall tubings, it may be desirable to apply a positive pressure to the surface of the liquid thermosettable composition to assist it in thoroughly penetrating the layers of mica flakes so as to fill all the interstices and spaces therein.

The impregnated tube 20, still disposed on the mandrel 10, is withdrawn from the vacuum impregnating tank and permitted to drain briefly. The impregnated tube 20 is then wrapped with an impervious sheet wrapping in order to prevent escape of the liquid resinous composition therefrom.

The impervious sheet wrapping is preferably a plastic or resinous tape which is not subject to attack by the liquid impregnating composition. We have employed tapes prepared from cellulose acetate, polyvinyl alcohol, polyvinylidene chloride, polytetrafluoroethylene, synthetic rubbers, such as chloroprene rubber, polyethylene glycol-terephthalate polymer and polyethylene. Five mil thick tape, one inch wide, applied half-lapped, has been satisfactory. We have successfully used one mil thick tape, 1½ inches in width, composed of polyethylene glycol-terephthalate polymer. In some cases we have applied one layer of polytetrafluoroethylene tape and covered this over with a thinner and more elastic polyethylene tape wrapping. The polytetrafluoroethylene stripped very readily from the tubes after curing of the resin. The last applied tape serves a number of purposes. The impervious tape wrapping minimizes the loss of the composition during subsequent curing of the resin. It compacts the layers of mica tape 14 so as to form a denser tube.

The mandrel 10 with the impregnated tube 20 thereon which has been covered with the impervious tape, is then heat treated at a temperature and for a time sufficient to only partly cure the thermosettable resin to an elastic condition. We have found it desirable to carry the curing to produce a resin having a flexibility corresponding to that secured by heating for a period of from three to four hours at 135° C. a composition composed of 50% by weight of monostyrene and 50% by weight of a polyester of a viscosity of 1,000 poises at 25° C. prepared from 44 mole percent of adipic acid, 6 mole percent of fumaric acid and 50 mole percent of propylene glycol catalyzed with 0.5% by weight of tert-butyl peroxide. When cured to this state the resin is partly but not fully thermoset and possesses elastic or rubbery characteristics. The partly cured resin possesses great adherence to mica flakes. It will be understood that the proportion of catalysts and temperatures employed to secure the curing may be varied substantially.

Thereafter the impervious sheet wrapping may be removed from the tube 20 and then the mandrel 10 may be withdrawn from the tube 20 without much difficulty. As illustrated in Fig. 2 of the drawing, this will result in the mica tube 20 which is surprisingly flexible so that it may be bent and flattened to permit its installation in electrical apparatus. The mica tube 20 may be cut or otherwise machined to enable its use for various purposes. Thus, the mica tubes or other formed members may be used for portions of high voltage bushings, for application to bolts and studs for use in generator fields and the like. Channels prepared in a similar way may be bent and applied to armature support rings in motors and generators. Those acquainted with the electrical industry will be aware of numerous useful applications for the flexible members of the present invention.

EXAMPLE I

Tubes were prepared by applying to a 4 centimeter diameter mandrel a coating of a polytetrafluoroethylene suspension and baking at 330° C. Over this was applied 6 layers of a mica tape comprising front and back sheets of 1 mil thick paper and 5 mils of mica flakes disposed therebetween. The resinous binder employed in the mica tape comprised the polyester reaction product of 44 mole percent of adipic acid, 6 mole percent of fumaric acid and 50 mole percent of propylene glycol reacted to a viscosity of 1,000 poises. The amount of this polyester reaction product comprised 5% of the weight of the tape. The mandrel with the applied mica tape was then impregnated in a liquid completely reactive thermosettable resinous composition comprising 40% by weight of monostyrene and 60% by weight of the same polyester that had been used in preparing the mica tape. This resinous composition was catalyzed with 0.5% tert-butyl peroxide. The tube, after evacuation to 1 inch of mercury absolute pressure, was flooded with the liquid reactive composition and atmospheric pressure was applied to the surface of the composition to assist in the impregnation. After impregnation, the tube was taped with tape comprising a 1 mil thick film of the polymethylene glycol-terephthalate polymer previously mentioned. This tape was impervious to the liquid composition and served to prevent any escape of it from the tube. The mandrel with the tube thereon was baked at 135° C. for 3 hours. The impervious sheet was then removed and the tube slipped off the mandrel. The resulting mica tube was found to have a dielectric strength of over 400 volts per mil. It was quite flexible and the tube could be flattened considerably without cracking or other damage to it. No tube previously made from mica approached it in the combination of electrical and mechanical properties along with the substantial flexibility that it possessed.

The process of Example I can be modified by wrapping over the mica tube before impregnation a layer of one inch wide 10 mil thick glass tape, the layer of the glass fiber tape being butted. The impregnation and curing steps are otherwise similar. After removal of the impervious sheet wrapping and removing from the mandrel, there will be obtained a tube having the cross-sectional shape shown in Fig. 3 of the drawing. The tube 40 comprises a plurality of layers 42 of mica and an outer wrapping 44 of the glass fiber tape all flexibly but strongly united with the partially cured resinous composition.

Numerous other completely-reactive multi-component polymerizable compositions are known to the art. Such compositions include, in many cases, an unsaturated resinous component—particularly an unsaturated polyester resin—and an unsaturated polymerizable liquid monomer. Particularly good results have been secured by employing as the polyester resin the reaction product of an ethylenic dicarboxylic acid or anhydride thereof such, for example, as maleic acid, fumaric acid, maleic anhydride, monochloromaleic acid, itaconic acid, itaconic anhydride, citraconic acid and citraconic anhydride. The unsaturated dicarboxylic acid or anhydride or mixtures thereof are reacted with a substantially molar equivalent of a polyhydric alcohol such as ethylene glycol, glycerol, propylene glycol, diethylene glycol, or pentaerythritol or mixtures thereof. Castor oil has been employed successfully in reactions with maleic anhydride, and the resultant castor oil maleate ester admixed with a polymerizable unsaturated monomer, for example, monostyrene, in the proportions of from 30 to 60 parts by weight of the monostyrene and from 70 to 40 parts by weight of the ester. In the preparation of the unsaturated alkyd esters, an ethylenically unsaturated alpha-beta dicarboxylic acid or anhydride may be replaced with up to 95% of the weight thereof by a saturated aliphatic dicarboxylic acid or aryl dicarboxylic acid or anhydride, such, for example, as succinic acid, adipic acid, sebacic acid, phthalic acid, phthalic anhydride or the like. Also, mixtures of polyhydric alcohols may be employed. In some instances, epoxides have been employed in lieu of glycols, particularly in reactions with dicarboxylic acids instead of their anhydrides.

The resulting polyesters may be dissolved in the liquid vinyl aryl monomer. Examples of such monomers are monostyrene, alphamethyl styrene, 2,4-dichlorostyrene, paramethylstyrene and divinyl benzene and mixtures of two or more of any of these.

The liquid vinyl aryl monomer may be admixed with a portion of one or more other liquid vinyl monomers. Thus 40 parts of a mixture of 20% by weight of diallyl phthalate and 80% by weight of monostyrene may be employed to dissolve 60 parts by weight of an unsaturated polyester. Other liquid vinyl monomers that may be employed to replace a part of the vinyl aryl monomer are allyl alcohol, methylallyl alcohol, diallyl succinate, allyl acrylate, methyl methacrylate, viny acetate and 1,3-chloroprene. As much as 50%, or even more in some cases, of the monostyrene may be replaced.

An excellent completely reactive composition is one composed of a solution in from 30 to 60 parts of arylalkene polymerizable monomer of from 70 to 40 parts by weight of the alkyd reaction products of (A) an unsaturated acidic compound from the group consisting of maleic acid, maleic anhydride, fumaric acid, citraconic acid and citraconic anhydride in admixture with one or more saturated straight chain dicarboxylic acids having the carboxyl groups disposed at the end of the straight chain, the chain having from 2 to 10 non-carboxyl carbon atoms and no other reactive groups, and (B) a molar equivalent, within ±10%, of an aliphatic saturated glycol having no other reactive group than the hydroxyl groups. The proportion of the unsaturated acidic compound in the mixture of acids should be between 5% and 50% of the weight of the mixture. Suitable saturated dicarboxylic acids are adipic acid, sebacic acid, azelaic acid, suberic acid, succinic acid, decamethylene dicarboxylic acid and diglycolic acid and mixtures thereof. With the longer chain saturated dicarboxylic acids, as, for example, sebacic acid, the proportion of maleic anhydride, for example, may be higher than if the saturated acid were all succinic acid, if cured products of similar degrees of hardness are desired. Suitable glycols for reaction with the mixture of saturated and unsaturated acids are ethylene glycol, propylene glycol, diethylene glycol, 1,5-pentanediol and triethylene glycol. Mixtures of the glycols are suitable for producing the reaction product. The reaction of the (A) acidic compounds and (B) the glycols may be carried out by heating in a reaction vessel at temperatures of from 100° C. to 250° C. for from 24 hours to 2 hours to a low acid number of below 60.

The following are specific examples of the preparation of the unsaturated alkyd reaction products to be dissolved in the vinyl aryl monomer:

EXAMPLE II

A mixture of 44 mole percent of adipic acid and 6 mole percent of fumaric acid was combined with 50 mole percent of propylene glycol and reacted with $CO_2$ sparging, for about 4 hours at 140° C. in a closed reaction vessel, after which the temperature was raised to 220° C. over a 4-hour period and the reaction was continued at 220° C. for 8 hours. A syrupy polyester resin was produced.

Another composition comprised the reaction product of 10 mole percent of maleic anhydride, 40 mole percent of adipic acid, and 50 mole percent of diethylene glycol.

EXAMPLE III

A reaction product was prepared by reacting 30 mole percent of sebacic acid, 20 mole percent of maleic anhydride, and 50 mole percent of diethylene glycol under the same conditions as in Example I with a syrupy resin of low acid number resulting.

The unsaturated esters or alkyd resins of these Examples II and III are dissolved in a monomeric compound having the reactive group $>C=C<$ such as monostyrene or a simple substitution derivative of monostyrene, or a mixture of two or more monomers, as above described, to produce low viscosity, completely reactive solutions having present from 40% to 70% by weight of the unsaturated ester. Particularly good results have been obtained by dissolving the unsaturated esters in the monostyrene to produce solutions containing from 40% to 50% by weight of monostyrene and the balance, 60% to 50% by weight, composed of the unsaturated esters.

The above fluid resinous compositions will polymerize completely upon heating in the presence of one or more vinyl-type polymerization catalysts, such as benzoyl peroxide, lauroyl peroxide, methyl ethyl ketone peroxide, t-butyl hydroperoxide, ascaridole, tert-butyl perbenzoate, di-t-butyl diperphthalate, ozonides, and similar catalysts, in an amount of from 0.1% to 2% and more, by weight. Polymerization accelerators such as cobalt naphthenate and other driers may be employed. The proportion of the catalyst obviously may be present in amounts differing from these percentages.

Channels and other shapes may be easily prepared by cutting away portions of the cured tubes. Thus a square tube can be cut or machined to remove one side, thereby leaving a channel.

The curing of the applied completely reactive resin in the mica members will be completed after installation of the members in electrical machines. After a long period of 6 months or more at moderate temperatures below 100° C. the resin will be fully cured and the tubes or other members will be much less flexible than at a time soon after they have been made.

It will be understood that the above examples are illustrative and not limiting.

We claim as our invention:

1. A flexible tube comprising a plurality of layers of helically wrapped mica tape, the tape comprising a sheet backing and mica flakes disposed thereon, and a thermosettable resinous binder impregnating the spaces and interstices between the layers of mica tape and between the mica flakes, the resinous binder composed of a partly cured composition comprising essentially from 30% to 60% by weight of a liquid vinyl aryl monomer and from 70% to 40% by weight of an unsaturated polyester of an ethylenic dicarboxylic acid and a polyhydric alcohol dissolved therein, the composition being heat-treated for a sufficient period of time and at a temperature to produce a partly cured resin having a flexibility corresponding substantially to that secured by heating for a period of from 3 to 4 hours at 135° C. a composition composed of 50% by weight of monostyrene and 50% by weight of a polyester of a viscosity of 1,000 poises at 25° C. prepared from 44 mole percent of adipic acid, 6 mole percent of fumaric acid and 50 mole percent of propylene glycol catalyzed with 0.5 percent by weight of tert-butyl peroxide.

2. The flexible tube of claim 1, wherein the exterior surface of the tube is wrapped with glass fiber fabric, the glass fiber fabric also being impregnated with the partly cured resinous binder.

3. The flexible tube of claim 1, wherein a portion of the vinyl aryl monomer, not exceeding 50% by weight, is replaced by another liquid monomer having a reactive $>C=C<$ group, the monomer being selected from the group consisting of allyl, diallyl and methallyl esters and alcohols, and acrylate esters.

4. A flexible electrically insulating member comprising superposed layers of mica flakes and a thermosettable resinous binder impregnating the spaces and interstices between the mica flakes, the resinous binder composed of a partly cured composition comprising essentially from 30% to 60% by weight of a liquid vinyl aryl monomer and from 70% to 40% by weight of an unsaturated polyester of an ethylenic dicarboxylic acid and a polyhydric alcohol dissolved therein, the composition being heat-treated for a sufficient period of time and at a temperature to produce a partly cured resin having a flexibility corresponding substantially to that secured by heating for a period of from 3 to 4 hours at 135° C. a composition composed of 50% by weight of monostyrene and 50% by weight of a polyester of a viscosity of 1,000 poises at 25° C. prepared from 44 mole percent of adipic acid, 6 mole percent of fumaric acid and 50 mole percent of propylene glycol catalyzed with 0.5 percent by weight of tert-butyl peroxide.

5. The member of claim 4, wherein the exterior surface of the member comprises a layer of glass fiber fabric also impregnated with the partly cured resinous binder.

6. The member of claim 4, wherein a portion of the vinyl aryl monomer, not exceeding 50% by weight, is replaced by another liquid monomer having a reactive $>C=C<$ group, the monomer being selected from the group consisting of allyl, diallyl and methallyl esters and alcohols, and acrylate esters.

7. In the process of preparing flexible mica tubing from mica flakes and a thermosettable resinous impregnant, the steps comprising applying to the surface of a mandrel a layer of parting material, wrapping on the treated surface of the mandrel a plurality of layers of sheet mica material, the sheet mica material comprising a sheet backing and a layer of mica flakes disposed on the sheet backing, and a liquid resinous binder applied to unite the mica flakes and sheet backing, the resinous binder having a viscosity of from 25 to 10,000 poises at 25° C., impregnating the mica sheet wrapping on the mandrel with a liquid, completely reactive, thermosettable resinous composition, which is compatible and miscible with the liquid resinous binder, the liquid, completely reactive, thermosettable resinous composition comprising essentially from 30% to 60% by weight of a liquid vinyl aryl monomer and from 70% to 40% by weight of an unsaturated polyester of an ethylenic dicarboxylic acid and a polyhydric alcohol dissolved in the liquid vinyl aryl monomer, wrapping the impregnated mica layers with an impervious sheet material to prevent escape of the liquid impregnant, heat-treating the entire mandrel assembly at a temperature and for a period of time to partly cure the resinous impregnant to produce a partly cured resin having a flexibility corresponding substantially to that secured by heating for a period of from 3 to 4 hours at 135° C. a composition composed of 50% by weight of monostyrene and 50% by weight of a polyester of a viscosity of 1,000 poises at 25° C. prepared from 44 mole percent of adipic acid, 6 mole percent of fumaric acid and 50 mole percent of propylene glycol catalyzed with 0.5 percent by weight of tert-butyl peroxide, removing the impervious sheet material and removing the resulting mica tube from the mandrel.

8. The process of claim 7, wherein a layer of glass fiber fabric is wrapped over the layers of sheet mica before impregnation.

References Cited in the file of this patent
UNITED STATES PATENTS

| | | |
|---|---|---|
| 1,173,907 | Williamson | Feb. 29, 1916 |
| 1,216,265 | Baekeland | Feb. 20, 1917 |
| 1,784,737 | Lloyd | Dec. 9, 1930 |
| 1,975,078 | Boughton | Oct. 2, 1934 |
| 2,255,313 | Ellis | Sept. 9, 1941 |
| 2,416,143 | Berberich | Feb. 18, 1947 |
| 2,477,791 | Foster et al. | Aug. 2, 1949 |
| 2,562,004 | Watson et al. | July 24, 1951 |
| 2,609,319 | Boge | Sept. 2, 1952 |
| 2,656,290 | Berberich et al. | Oct. 20, 1953 |
| 2,674,648 | Nicodemus | Apr. 6, 1954 |